United States Patent [19]

Schumacher

[11] Patent Number: 4,995,282
[45] Date of Patent: Feb. 26, 1991

[54] CONTROLLABLE INERTIA FLYWHEEL

[76] Inventor: Larry L. Schumacher, 18876 Tenderfoot Trail, Newhall, Calif. 91321

[21] Appl. No.: 381,800

[22] Filed: Jul. 19, 1989

[51] Int. Cl.$^5$ ............................................. F03G 3/08
[52] U.S. Cl. ................................ 74/572; 318/466
[58] Field of Search .................... 74/572; 290/217; 318/466

[56] References Cited

U.S. PATENT DOCUMENTS

| | | | |
|---|---|---|---|
| 94,091 | 8/1869 | Duclos | 74/572 X |
| 2,914,962 | 12/1959 | Schmidt | 74/572 |
| 4,725,766 | 2/1988 | Pinson | 74/572 X |
| 4,730,154 | 3/1988 | Pinson | 74/572 X |

FOREIGN PATENT DOCUMENTS

| | | | |
|---|---|---|---|
| 60-184745 | 9/1985 | Japan | 74/572 |
| 61-286636 | 12/1986 | Japan | 74/572 |
| 1036992 | 8/1983 | U.S.S.R. | 74/572 |
| 1184993 | 10/1985 | U.S.S.R. | 74/572 |

Primary Examiner—Allan D. Herrmann

[57] ABSTRACT

The invention is a flywheel with apparatus that permits the flywheel's rotational inertia to be controlled during rotation. A flywheel attached to a drive shaft has at least two control masses attached such that they can move radially approximately orthogonal to the rotational axis in channels and slots in the flywheel structure. The control masses are mechanically attached to a shaft collar which rotates with and axially translates on the surface of the splined drive shaft. An electrical actuator controls the axial position of the shaft collar on the drive shaft and the resultant radial position of the control masses on the flywheel. The flywheel inertia is the sum of the inertias of the flywheel, shaft collar and the inertia of the control masses which is a function of their radial displacement relative to the rotational axis as controlled by the electrical actuator. Springs maintain forcible contact between the flywheel and variable inertia masses, and between the shaft collar and electrical actuator which keeps the composite mass center on the rotational axis.

3 Claims, 1 Drawing Sheet

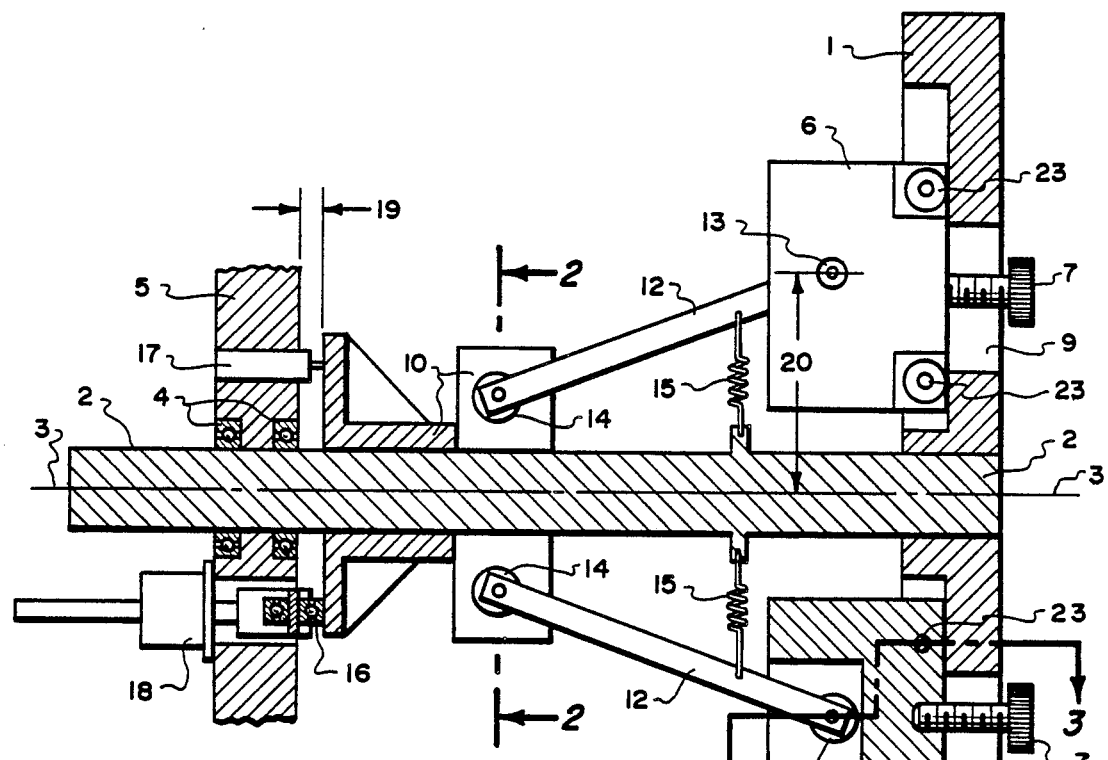
*Fig. 1.*
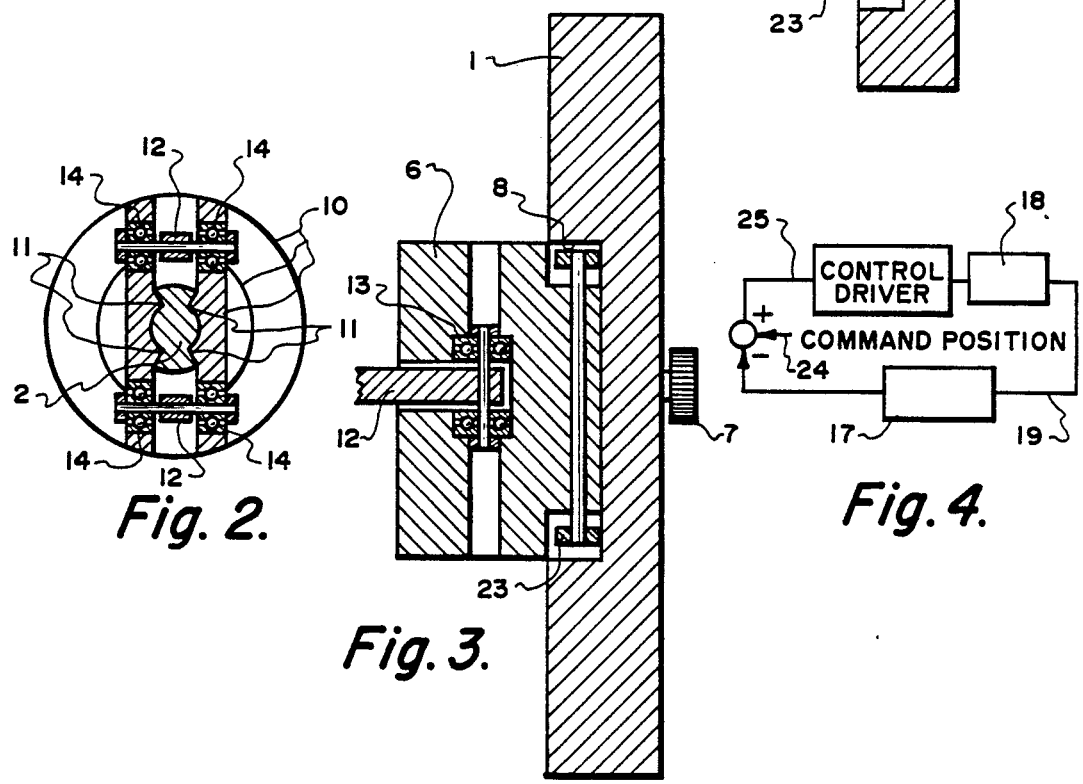
*Fig. 2.*
*Fig. 3.*
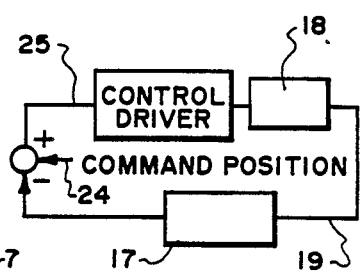
*Fig. 4.*

CONTROLLABLE INERTIA FLYWHEEL

FIELD OF THE INVENTION

The invention is a rotational flywheel with mechanism allowing the rotational inertia to be changed in a controlled way during rotation.

BACKGROUND OF THE INVENTION

The angular momentum of rotational elements described here is the product of the rotational angular rate and the inertia of the rotating element around the rotational axis.

In most applications, the angular momentum of a constant inertia rotating flywheel is controlled with the rotational rate of the flywheel.

This invention is used in applications where it is desired to change a flywheel's angular momentum without changing the flywheel's rotational rate. In this case, the flywheel's angular momentum can be changed by adjusting the flywheel's rotational inertia.

Accordingly, an object of this invention is provide apparatus for controlling the rotational inertia of a flywheel.

Another object of this invention is to maintain the mass center of all rotating flywheel elements on the flywheel rotational axis.

Another object of the invention is to have all electrical flywheel inertia control elements attached to non-rotating structure.

BRIEF DESCRIPTION OF THE INVENTION

The invention is a flywheel with apparatus that permits the flywheel's rotational inertia to be controlled during rotation. The invention has a constant inertial flywheel attached to a drive shaft. The flywheel has at least two control masses attached such that they can move radially approximately orthogonal to the rotational axis in channels and slots in the flywheel structure. The control masses are mechanically attached by linkage structures to a shaft collar which rotates with and can slide axially on the surface of the splined drive shaft. An electrical actuator attached to support structure controls the axial position of the shaft collar on the drive shaft and through the linkage structures the resultant radial position of the control masses on the flywheel. The flywheel inertia is the sum of the constant flywheel and shaft collar inertias plus the inertia of the control masses and linkage structures which is a function of their radial displacement relative to the rotational axis as controlled by the electrical actuator.

Springs are attached between the drive shaft and the linkage structures to maintain forcible contact between the flywheel and variable inertia masses, and between the shaft collar and electrical actuator. The spring force transmitted through the rotational attachments keeps the structure mass center on the rotational axis.

BRIEF DESCRIPTION OF DRAWINGS

FIG. 1 is a partial half section of the Controllable Inertia Flywheel with the section plane containing the drive shaft rotational axis.

FIG. 2 illustrates a section plane through the shaft collar orthogonal to the drive shaft rotational axis.

FIG. 3 is a section plane through the flywheel and a control mass.

FIG. 4 illustrates the Controllable Inertia Flywheel control diagram.

DETAILED DESCRIPTION ON THE INVENTION

FIGS. 1, 2, 3 illustrates the Controllable Inertia Flywheel partially sectioned. Flywheel 1 is structure attached to drive shaft 2 with a constant rotational inertia around the drive shaft rotational axis 3. The mass center of flywheel 1 and drive shaft 2 is on the drive shaft rotational axis 3. Drive shaft 2 is rotationally mounted in bearings 4 in support structure 5.

At least two control masses 6 are constrained to move radially, approximately orthogonal to drive shaft rotational axis 3, by threaded means 7, slots 9 and radial channels 8 in flywheel structure 1.

Shaft collar 10 is constrained by splines 11 to slid axially, approximately parallel to axis 3, on shaft 2 and to rotate with shaft 2. Shaft collar 10 is attached by linkage structures 12 to control masses 6. Linkage structures 12 are attached to control masses 6 by preloaded bearings 13, and structures 12 are attached to shaft collar 10 by preloaded bearings 14. The bearings 13,14 permit rotation of linkage structures 12 about axes orthogonal to axis 3 without lost linear or angular motion. Springs 15 attach linkage structures 12 to the drive shaft 2. Springs 15 resist centrifugal forces on control masses 6 forcing control masses 6 friction reduction means 23 into forcible contact with flywheel 1 and forcing shaft collar 10 into contact with inertia control actuator bearing 16 and collar position sensor 17.

Inertia control actuator 18 is attached to support structure 5 and positions shaft collar 10 on shaft 2 by forcing actuator bearing 16 into contact with collar 10 such that bearing 16 rolls when drive shaft 2 and shaft collar 10 rotates around axis 3.

The total rotational inertia of the controllable inertia flywheel is the sum of flywheel 1, drive shaft 2, shaft collar 10, linkage structures 12 and control masses 6 inertias relative to rotational axis 3. As the control actuator 18 increases the shaft collar displacement 19 which increases the distance 20 between the mass centers' of control masses 6 and rotational axis 3, and the control flywheel's total rotational inertia increases. Conversely, as the control actuator 18 decreases the shaft collar displacement 19 and control masses 6 displacements 20, the flywheel's total rotational inertia decreases.

The movement of shaft collar and control masses is restrained by springs 15 such that the combined mass center of flywheel 1, drive shaft 2, shaft collar 10, linkage structures 12, and control masses 6 remains on rotational axis 3.

FIG. 4 illustrates a control means which compares the measured shaft collar displacement 19 to a commanded position 24 producing an error signal 25 to drive actuator 18.

Having described the invention, I claim:

1. A flywheel apparatus comprising:
    a. a drive shaft supporting said flywheel apparatus cantilevered from a single bearing;
    b. a constant inertia flywheel fixedly attached to said drive shaft;
    c. at least two control masses slidingly attached to said constant inertia flywheel by slots and threaded means and translatable orthogonal to a drive shaft rotational axis;
    d. a shaft collar constrained to rotate with sad drive shaft and forced by an inertia control actuator to slid on said drive shaft's surface parallel to said drive shaft rotational axis;

e. linkage structures attaching said shaft collar to each control mass through bearings that minimize lost linear or angular motion;

f. springs attaching said linkage structures to said drive shaft;

g. a control actuator positioning said shaft collar and said control masses to achieve a desired flywheel inertia.

2. An apparatus for changing the inertia of a flywheel structure during rotation comprising:

a. a drive shaft rotating in a single bearing support;

b. a flywheel structure with a constant inertia attached to said drive shaft, said flywheel structure having a mass center on a drive shaft rotational axis;

c. at least two control masses translatable orthogonal to said drive shaft rotational axis within structural channels on said flywheel structure;

d. a shaft collar constrained to rotate with said drive shaft and to slid on said drive shaft;

e. linkage structures attaching said shaft collar to each control mass through bearings that minimize lost linear or angular motion and transforming said shaft collar translation on said drive shaft into a control masses translation orthogonal to said drive shaft rotational axis on the flywheel structure;

f. springs providing tension between said linkage structures and said drive shaft and constraining a combined mass center of the control masses to remain on said drive shaft rotational axis;

g. actuator means attached to the support structure to position said shaft collar axial translation on said drive shaft forcing said control masses to translate radially on the flywheel structure;

h. a shaft collar position sensor attached to said support structure and in contact with said shaft collar, said shaft collar position sensor sensing the shaft collar translation on the drive shaft;

i. actuator control means disposed on said support structure to control said actuator means positioning said shaft collar and said control masses relative to the support structure to achieve a commanded flywheel inertia as verified by the shaft collar position sensor.

3. Apparatus for changing the angular momentum of a flywheel without changing the rotational rate comprising:

a. a drive shaft with a drive shaft rotational axis rotating in a single bearing mounted in a support structure;

b. a flywheel structure attached to said drive shaft and having a constant rotational inertia and a mass center on said drive shaft rotational axis;

c. at least two control masses having translational freedom orthogonal to said drive shaft rotational axis within structural channels on said flywheel structure;

d. a shaft collar sliding on and rotating with said drive shaft;

e. linkage structures attaching said shaft collar to each control mass through bearings that minimize lost linear or angular motion and transforming a shaft collar axial translation parallel to said drive shaft rotational axis into a control masses translation orthogonal to said drive shaft rotational axis;

f. actuator means attached to said support structure forcing said shaft collar axial translation parallel to said drive shaft rotational axis and said control masses translation orthogonal to the drive shaft rotational;

g. tensioning means between said linkage structures and said drive shaft producing force between said shaft collar and actuator means, and between said control masses and said flywheel structure while constraining a combined mass center of said control masses to remain on said drive shaft rotational axis;

h. a shaft collar position sensor attached to said support structure sensing said shaft collar axial translation parallel to said drive shaft rotational axis;

i. actuator control means disposed on said support structure driving said actuator means to position said shaft collar and said control masses to achieve a commanded flywheel inertia.

* * * * *